United States Patent
Line et al.

(10) Patent No.: US 10,160,392 B2
(45) Date of Patent: Dec. 25, 2018

(54) COMPOSITE SEAT SIDE STORAGE BIN

(71) Applicant: Ford Global Technologies, LLC, Dearborn, MI (US)

(72) Inventors: Johnathan Andrew Line, Northville, MI (US); Marcos Silva Kondrad, Macomb, MI (US); Keith Allen Godin, Dearborn, MI (US); S. M. Akbar Berry, Windsor (CA); Kevin Preuss, Berkley, MI (US); David Frederick Lyons, New Haven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 15/420,691

(22) Filed: Jan. 31, 2017

(65) Prior Publication Data

US 2018/0215319 A1  Aug. 2, 2018

(51) Int. Cl.
| | |
|---|---|
| *B60R 7/04* | (2006.01) |
| *B60N 2/20* | (2006.01) |
| *B60N 2/22* | (2006.01) |
| *B60N 2/32* | (2006.01) |
| *B60R 11/02* | (2006.01) |
| *B60R 16/023* | (2006.01) |
| *H01R 24/78* | (2011.01) |
| *H02J 7/02* | (2016.01) |
| *H02J 7/00* | (2006.01) |
| *B60R 11/00* | (2006.01) |
| *B60R 16/03* | (2006.01) |

(52) U.S. Cl.
CPC .............. *B60R 7/043* (2013.01); *B60N 2/206* (2013.01); *B60N 2/22* (2013.01); *B60N 2/32* (2013.01); *B60R 11/0252* (2013.01); *B60R 16/023* (2013.01); *H01R 24/78* (2013.01); *H02J 7/0052* (2013.01); *H02J 7/025* (2013.01); *B60R 16/03* (2013.01); *B60R 2011/0012* (2013.01); *H02J 2007/0062* (2013.01)

(58) Field of Classification Search
CPC ............ B60R 7/043; B60R 7/00; A47B 13/16
USPC .... 297/146, 188.04, 188.08, 188.09, 188.12, 297/188.01, 188.21
See application file for complete search history.

(56) References Cited

U.S. PATENT DOCUMENTS

| | | | |
|---|---|---|---|
| 1,379,499 A | 5/1921 | Williford | |
| 2,710,049 A | 6/1955 | Potocnik | |
| 2,833,334 A | 5/1958 | Hunt, Jr. | |
| 3,685,854 A | 8/1972 | Cadiou | |
| 3,807,799 A | 4/1974 | Freedman | |
| 3,951,486 A * | 4/1976 | Tracy | B60R 7/043 220/482 |
| 3,985,374 A | 10/1976 | Powaska | |
| 4,218,092 A | 8/1980 | Schach et al. | |

(Continued)

*Primary Examiner* — Jose V Chen
(74) *Attorney, Agent, or Firm* — Vichit Chea; Price Heneveld LLP

(57) ABSTRACT

A seating assembly includes a base. A cushion assembly is rotatably coupled with the base proximate a forward portion of the cushion assembly. A first removable peripheral bin is disposed on a side wall of the base. A second removable peripheral bin is disposed on a rear wall of the base. A power and data assembly includes a power relay and a data relay configured for use with mobile devices. The power and data assembly is disposed proximate a rear of the first removable peripheral bin and a side of the second removable peripheral bin.

18 Claims, 7 Drawing Sheets

(56) References Cited

U.S. PATENT DOCUMENTS

| | | | |
|---|---|---|---|
| 4,558,901 A | 12/1985 | Yokoyama | |
| 4,668,010 A | 5/1987 | Fujiwara | |
| 4,681,344 A | 7/1987 | Majerus | |
| 4,796,913 A | 1/1989 | Amabile et al. | |
| 4,973,017 A | 11/1990 | Takagi | |
| 5,096,256 A | 3/1992 | Mouri | |
| 5,433,503 A | 7/1995 | De Filippo | |
| 5,435,624 A | 7/1995 | Bray et al. | |
| 5,456,019 A | 10/1995 | Dowell et al. | |
| 5,620,228 A | 4/1997 | Ito et al. | |
| 5,737,845 A | 4/1998 | Marasus | |
| 5,816,650 A * | 10/1998 | Lucas, Jr. | B60N 2/3045 297/188.1 |
| 5,878,672 A | 3/1999 | Ostermann et al. | |
| 5,911,471 A * | 6/1999 | Benedict | B60N 2/3011 297/158.1 |
| 6,059,358 A * | 5/2000 | Derrick | B60N 2/206 297/125 |
| 6,102,463 A | 8/2000 | Swanson et al. | |
| 6,135,548 A | 10/2000 | McGuire | |
| 6,149,229 A * | 11/2000 | Dillon, Jr. | B60R 7/043 297/188.2 |
| 6,199,948 B1 * | 3/2001 | Bush | B60N 2/206 297/188.04 |
| 6,386,612 B2 * | 5/2002 | Hofmann | B60R 7/043 224/275 |
| 6,419,313 B1 * | 7/2002 | Newman | B60N 2/70 296/37.15 |
| 6,609,757 B2 | 8/2003 | Ott et al. | |
| 6,877,807 B2 * | 4/2005 | Mizuno | B60N 2/305 297/188.08 |
| 7,301,758 B2 | 11/2007 | Sitzler et al. | |
| 7,377,411 B1 * | 5/2008 | Stewart | B60R 7/043 224/197 |
| 7,399,032 B2 * | 7/2008 | Jones | B60R 7/043 297/188.04 |
| 7,421,956 B1 * | 9/2008 | McCarthy | A47B 9/14 108/147.21 |
| 7,455,204 B2 * | 11/2008 | Lippert | B60R 7/043 224/275 |
| 7,523,985 B2 * | 4/2009 | Bhatia | B60N 2/206 297/188.04 |
| 7,562,931 B2 * | 7/2009 | Stojanovic | B60N 2/3013 296/24.4 |
| 7,673,920 B2 * | 3/2010 | Nakamura | B60R 11/00 224/274 |
| 7,780,229 B2 | 8/2010 | Verhee | |
| 8,245,650 B1 * | 8/2012 | McKsymick | A47B 3/10 108/25 |
| 8,523,281 B2 | 9/2013 | Wahls | |
| 8,616,631 B2 * | 12/2013 | Westerink | B60N 2/24 297/188.08 |
| 9,896,010 B2 * | 2/2018 | Berno | B60N 3/002 |
| 9,930,972 B2 * | 4/2018 | Janay | A47D 3/00 |
| 9,950,674 B1 * | 4/2018 | Kalergis | B60R 7/043 |
| 2007/0052264 A1 | 3/2007 | Lee | |
| 2007/0052275 A1 | 3/2007 | Ghilzai | |
| 2007/0241235 A1 | 10/2007 | Atchison | |
| 2011/0012396 A1 | 1/2011 | Laake | |
| 2012/0146374 A1 | 6/2012 | Fujiwara | |
| 2012/0267933 A1 | 10/2012 | von Rothkirch und Panthen et al. | |
| 2013/0313869 A1 * | 11/2013 | Aguirre | B60R 7/043 297/188.09 |

\* cited by examiner

COMPOSITE SEAT SIDE STORAGE BIN

FIELD OF THE DISCLOSURE

The present disclosure generally relates to a storage bin, and more particularly to a composite seat side storage bin.

BACKGROUND OF THE DISCLOSURE

Modern seating assemblies utilize various systems to improve convenience and ease of use, including storage trays and compartments that provide desirable features to consumers. The disclosure provides various embodiments configured to improve storage technology to increase value and convenience to consumers.

SUMMARY OF THE DISCLOSURE

According to one aspect of the present disclosure, a seating assembly includes a base. A cushion assembly is rotatably coupled with the base proximate a forward portion of the cushion assembly. A first removable peripheral bin is disposed on a side wall of the base. A second removable peripheral bin is disposed on a rear wall of the base. A power and data assembly includes a power relay and a data relay configured for use with mobile devices. The power and data assembly is disposed proximate a rear of the first removable peripheral bin and a side of the second removable peripheral bin.

According to another aspect of the present disclosure, a seating assembly includes a base. A cushion assembly is rotatably coupled with the base proximate a forward portion of the cushion assembly. A first peripheral storage compartment is disposed on a side wall of the base. A second peripheral storage compartment is disposed on a rear wall of the base. One of a power plug assembly and a data plug assembly is juxtaposed between the first and second peripheral storage compartments.

According to yet another aspect of the present disclosure, a seating assembly includes a base. A cushion assembly is rotatably coupled with the base proximate a forward portion of the cushion assembly. A first peripheral storage compartment is disposed on a side wall of the base. A second peripheral storage compartment is disposed on a rear wall of the base. A power and data assembly extends from the first peripheral storage compartment and is in abutting contact with the second peripheral storage compartment.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
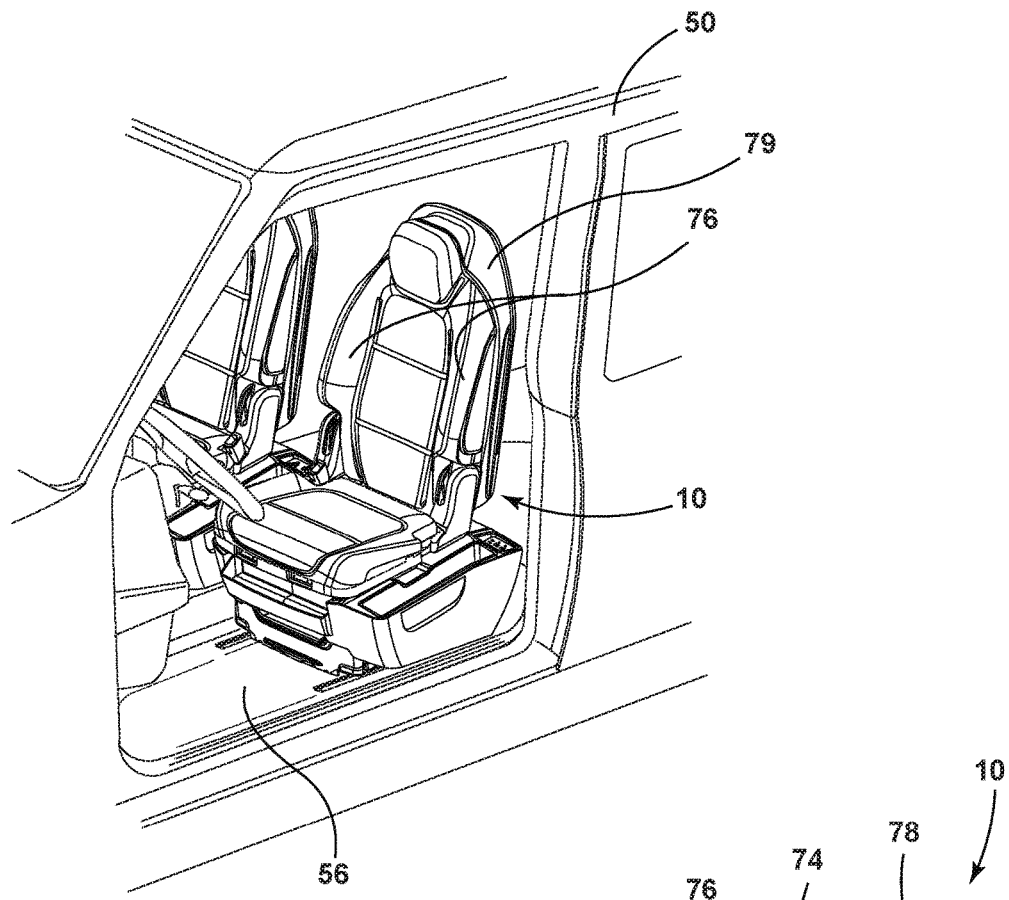
FIG. 1 is a top perspective view of a seating assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-5, reference numeral 10 generally designates a seating assembly that includes a base 12 and a cushion assembly 14 that is rotatably coupled with the base 12 proximate a forward portion 16 of the cushion assembly 14. A first removable peripheral bin 20 is disposed on a side wall 22 of the base 12. A second removable peripheral bin 26 is disposed on a rear wall 28 of the base 12. A power and data assembly 30 includes a power relay 32 and a data relay 34 configured for use with mobile electronic devices. The power and data assembly 30 is disposed proximate a rear 38 of the first removable peripheral bin 20 and a side 40 of the second removable peripheral bin 26.

With reference again to FIG. 1, the seating assembly 10 is generally constructed for use in a variety of environments, including residential or commercial applications, as well as in vehicles 50. Moreover, it will be understood that the seating assembly 10 as a whole may be used in any portion of the vehicle 50 as a driver seat, a passenger seat, or a rear passenger seat. The seating assembly 10 generally includes the base 12 supported on feet 54. The feet 54 may be operably coupled with a floor 56 of the vehicle 50. It will be understood that the feet 54 may be slidably coupled with the floor 56 or may maintain a stationary position relative to the floor 56 of the vehicle 50. The base 12 extends upwardly from the feet 54 and is configured to support a suspension assembly 58 and a seat 60. The cushion assembly 14 is positioned on the seat 60 and is configured to provide comfort to an occupant. In addition, the seat 60 includes a rear portion 62 and a forward portion 64. The forward portion 64 may be vertically higher than the rear portion 62 and sloped downward thereto. A seatback 66 is operably coupled with the seat 60 and is configured to pivot relative to the seat 60 between a fully reclined position (FIG. 1A) and a fully forward position (FIG. 3A). In addition, the seatback 66 may include one or more seatback arms pivotally coupled with the seatback 66. The seatback arms provide support to the arms of an occupant. The seatback 66 includes a lower lumbar cushion 72 and an upper thoracic cushion 74. The upper thoracic cushion 74 may be configured to rotate forward relative to the seatback 66. The seatback 66 also includes side bolsters 76 configured to cradle the sides of an occupant. A head restraint 78 is disposed on the seatback 66 and may be operable between a plurality of vertical and horizontal positions relative to the seatback 66. A back side of the seatback 66 may also include a work surface 79 that can be used to provide working space when the seatback 66 is folded forward.

Figure 1A:
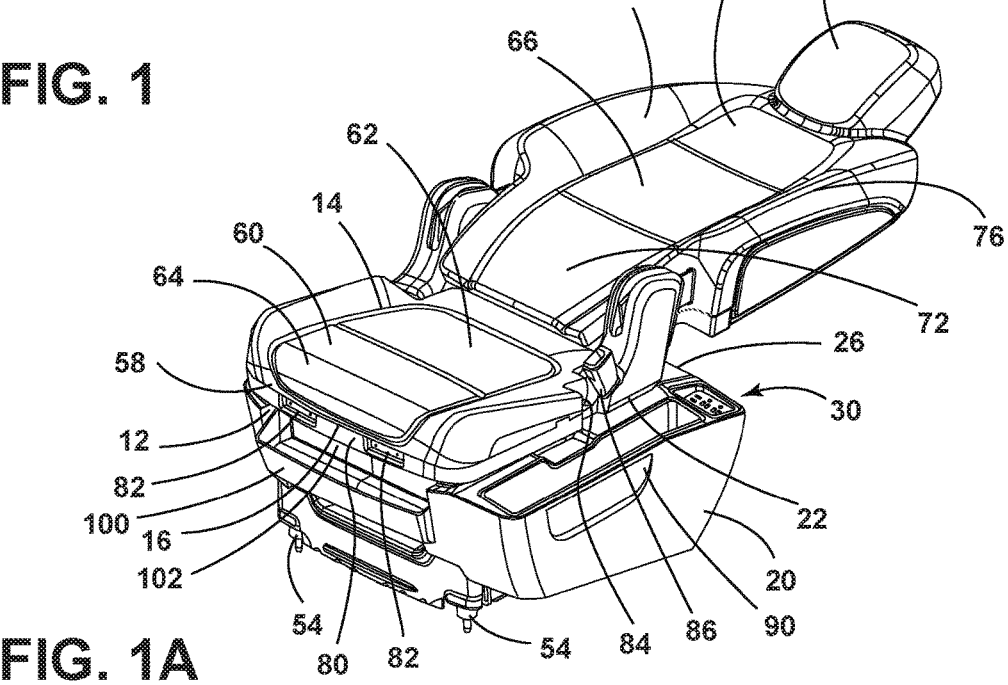
FIG. 1A is a top perspective view of a seat of the seating assembly of FIG. 1 in a reclined position.
Figure 2:
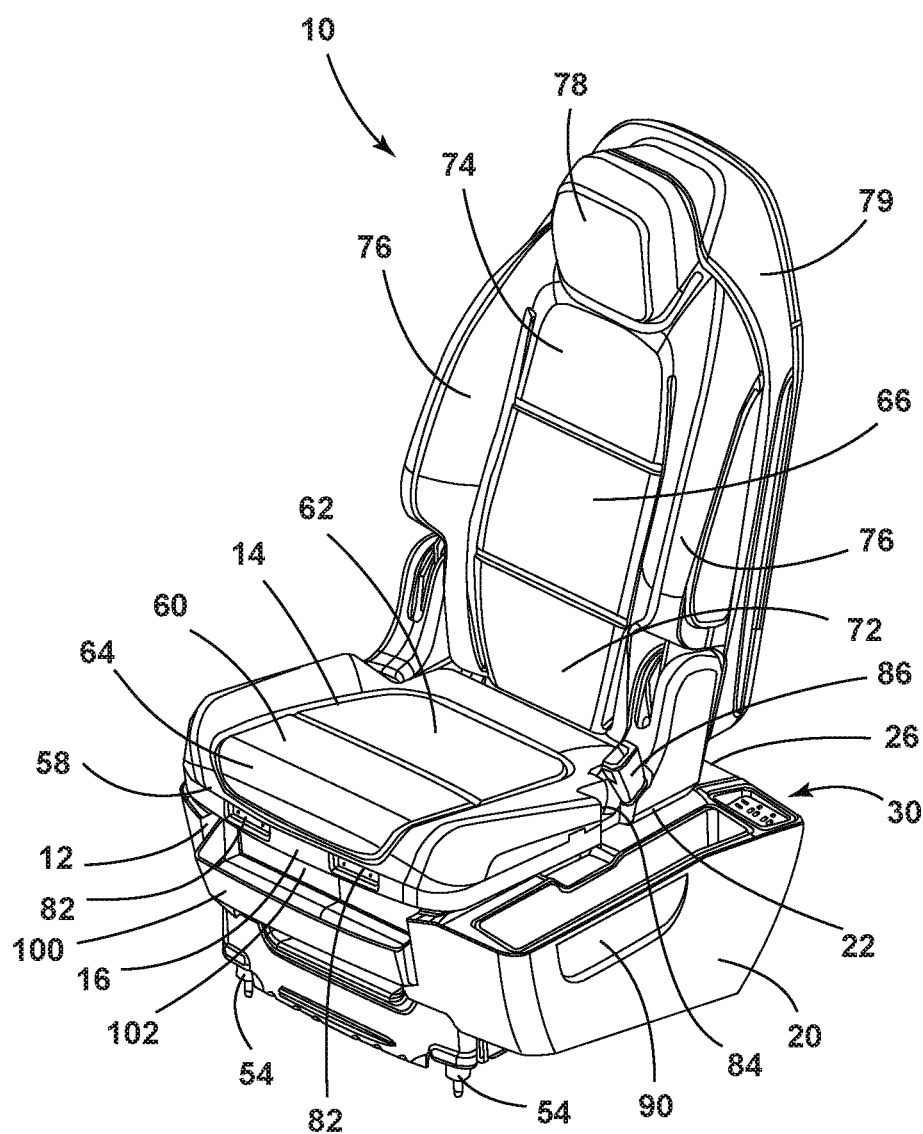
FIG. 2 is an enlarged top perspective view of a seating assembly of the present disclosure.

Referring again to FIGS. 1 and 2, the seating assembly 10 is generally configured to provide sleeping accommodations to an occupant. Accordingly, the seatback 66 is configured to pivot rearward relative to the seat 60, such that the seat 60 and the seatback 66 are aligned laterally or nearly aligned laterally (FIG. 1A). In this configuration, the seating assembly 10 can provide comfort to an occupant that wishes to rest or sleep for an extended period of time without leaving the safety of the vehicle 50. In an effort to provide increased comfort and support to the upper back of an occupant, upper thoracic cushion 74 may be configured to rotate forward relative to a design position where the upper thoracic cushion 74 is generally aligned with the lower lumbar cushion 72. Accordingly, the upper thoracic cushion 74 can rotate forward into abutting contact with an upper portion of the back of an occupant. This additional support lessens strain on the head and neck of the occupant.

Figure 3:
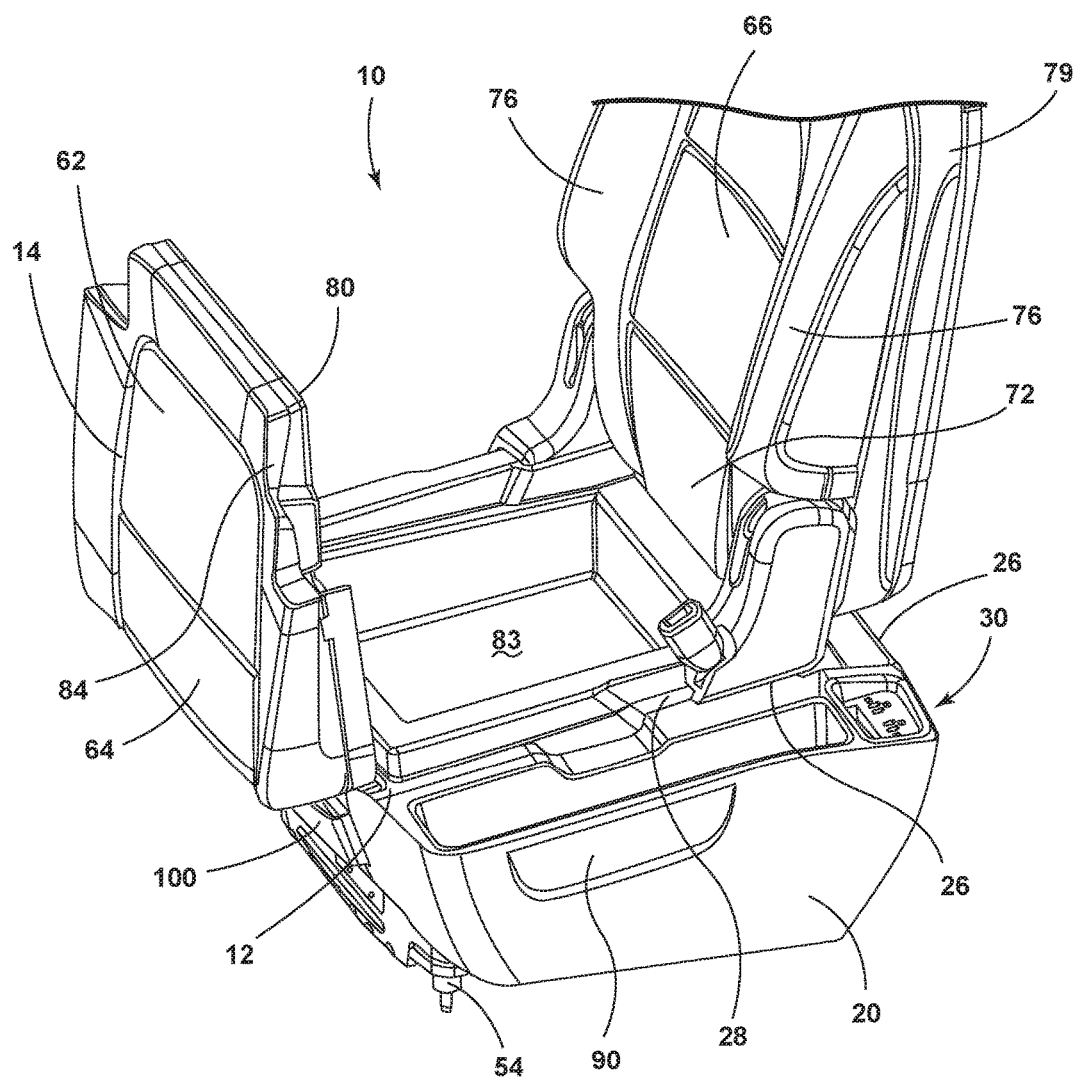
FIG. 3 is a top perspective view of a cushion assembly for a seating assembly of the present disclosure in an open position.
Figure 3A:
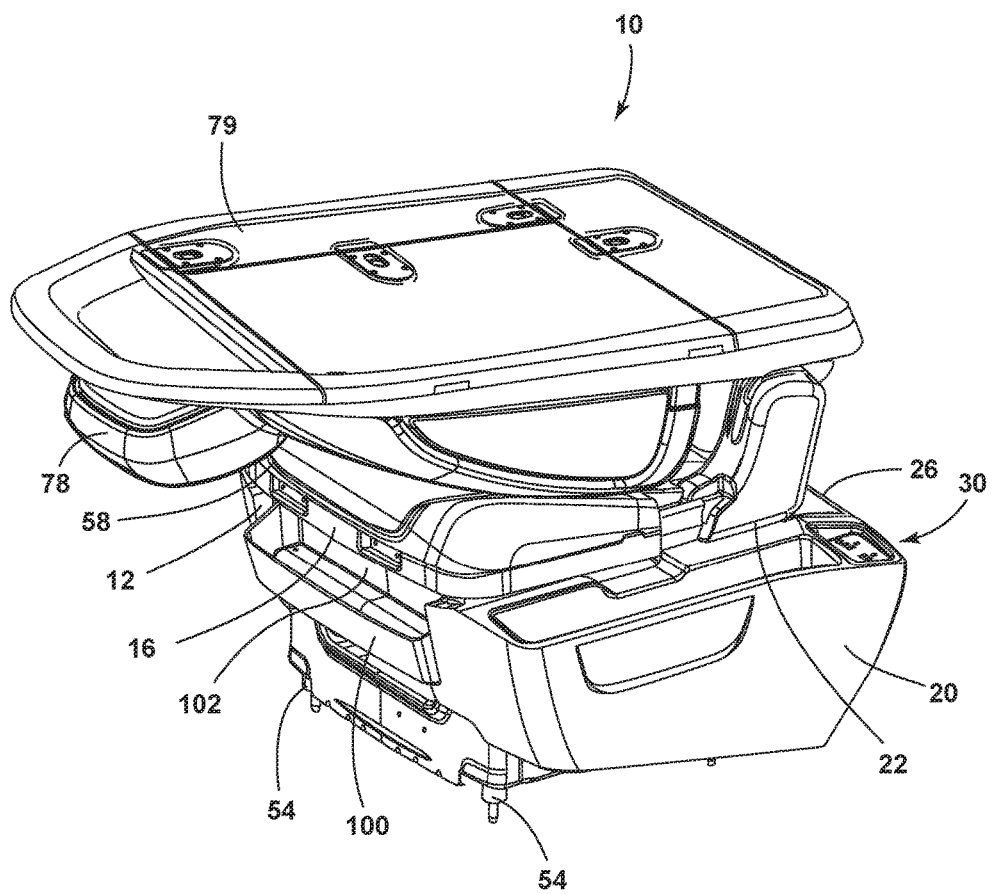
FIG. 3A is a top perspective view of a cushion assembly of the present disclosure with the seatback in a folded forward position.

With reference now to FIG. 3, the cushion assembly 14 is generally supported on a rigid seat member 80 that includes hinges 82, which allow for rotational movement of the cushion assembly 14 relative to the base 12. A storage compartment 83 is disposed below the rigid seat member 80. The storage compartment 83 can be used to store various items, including mobile devices and computers, and may be lockable such that firearms or other potentially dangerous items can be stored therein. A rear portion of the rigid seat member 80 is narrowed to allow room for first and second recliner hearts of the seatback 66. In addition, both the cushion assembly 14 and the rigid seat member 80 include a cutout 84 configured to accommodate a receiver of a seatbelt assembly 86. The first removable peripheral bin 20 is disposed adjacent to the side wall 22 of the base 12. The first removable peripheral bin 20 includes a recessed grip portion 90 that can be used to aid an occupant in installing or removing the first removable peripheral bin 20 from the side wall 22 of the base 12. The first removable peripheral bin 20 defines an opening into which items may be stored. These items may include keys, laptop computers, mobile devices, books, notepads, etc. The power and data assembly 30 is disposed adjacent to the first removable peripheral bin 20 proximate a rear of the seatback 66. As previously noted, the power and data assembly 30 includes both the power relay 32 and the data relay 34. Accordingly, mobile devices can be charged at the power and data assembly 30 or can be coupled via the data relay 34 to a controller area network (CAN) bus of the vehicle 50. It will be understood that data may be relayed from the vehicle 50 to the mobile device, or from the mobile device to the vehicle 50. In addition, it is contemplated that the data relay 34 may also include capabilities to provide power to a mobile device through the data relay 34 as would be understood by one having ordinary skill in the art.

The second removable peripheral bin 26 is disposed proximate a rear portion of the base 12 and is configured to store items similar to the first removable peripheral bin 20 disposed on the side wall 22 of the base 12. It will be understood that the second removable peripheral bin 26 may be independently coupled with the base 12 of the seating assembly 10, or may be operably coupled with the base 12 and the first removable peripheral bin 20. Moreover, the first removable peripheral bin 20 and the second removable peripheral bin 26 may include one or more walls that are integrally formed together. It will also be understood that the power and data assembly 30 may be a separate unit that is operably coupled with the base 12, or may be operably coupled with either or both of the first removable peripheral bin 20 and the second removable peripheral bin 26. Also, it will be understood that the first removable peripheral bin 20 may be disposed on either side of the base 12 and is not limited to the side wall 22.

Figure 4:
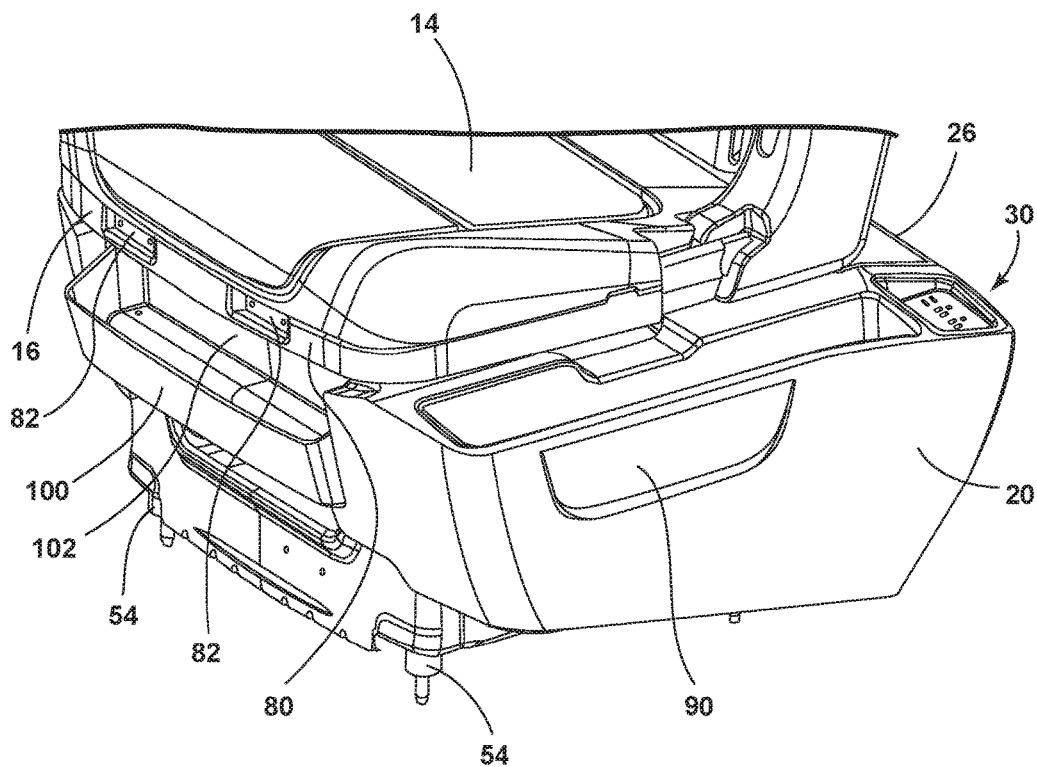
FIG. 4 is an enlarged top perspective view of a seating assembly of the present disclosure having multiple peripheral bins and a power and data assembly.
Figure 5:
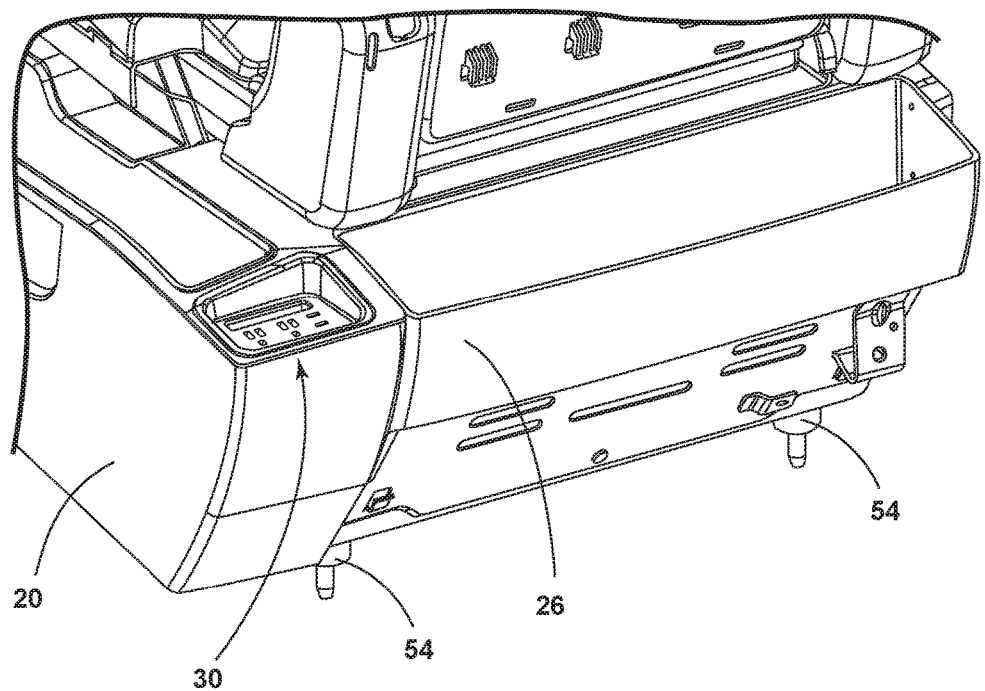
FIG. 5 is an enlarged rear perspective view of a power and data assembly of FIG. 4A.

With reference now to FIGS. 4-5, the seating assembly 10 may also include a third removable peripheral bin 100 disposed on a forward portion of the base 12. The third removable peripheral bin 100 is a forward peripheral bin that may be operably coupled with the first removable peripheral bin 20 disposed on the side wall 22 of the base 12, or may be operably coupled only with the base 12. Indeed, one or more walls of the third removable peripheral bin 100 may be integrally formed with one or more walls of the first removable peripheral bin 20. It is generally contemplated that the forward peripheral bin will be disposed below the rigid seat member 80 and the cushion assembly 14. The forward peripheral bin may include a variety of features, including those outlined above in relation to the first and second removable peripheral bins 20, 26. As illustrated, the third removable peripheral bin 100 is partially received in a cavity 102 defined in the base 12.

Figure 4A:
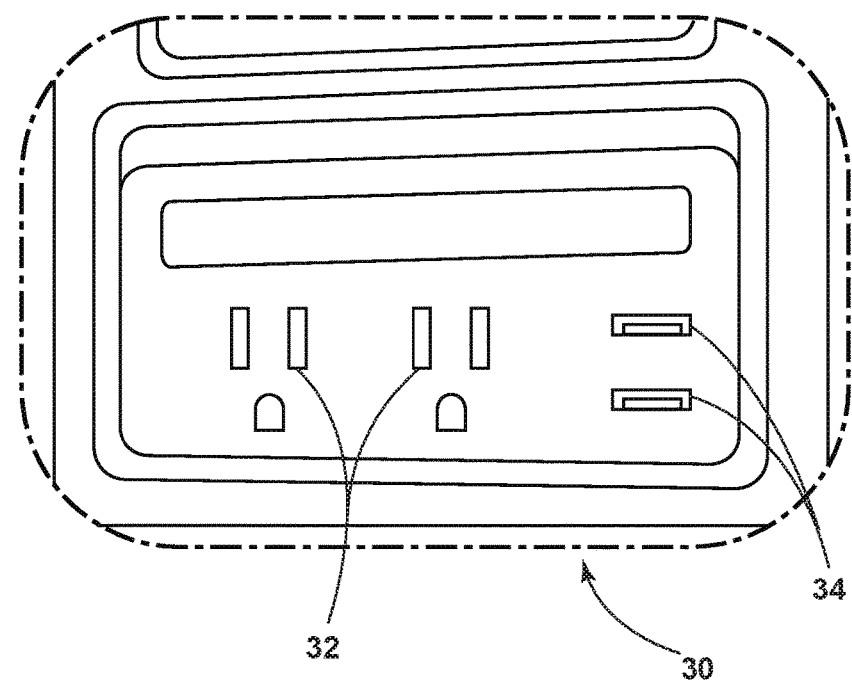
FIG. 4A is a top plan view of a power and data assembly of the present disclosure.

As shown in FIGS. 4A and 5, the power and data assembly 30 may be integrally formed with the first removable peripheral bin 20, the second removable peripheral bin 26, or both. In addition, the power and data assembly 30 includes the power relays 32 with three hole receivers for receiving traditional North American three-pronged power plugs. The power and data assembly 30 may include a cover or lid to conceal the power and data assembly 30 and to keep the power and data assembly 30 clean. The data relays 34 may be traditional data relays, such as universal serial bus (USB) receivers. Additionally, it will be understood that one or more of the first, second, and third removable peripheral bins 20, 26, and 100 may include inductive charging capabilities, such as a mobile device that can be placed on an inductive charging mat within one of the first, second, and third removable peripheral bins 20, 26, and 100 and be charged. An electromagnetic field generated by the inductive charging mat transfers energy to the mobile device.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A seating assembly comprising:
   a base;
   a cushion assembly rotatably coupled with the base proximate a forward portion of the cushion assembly;
   a first removable peripheral bin disposed on a side wall of the base;
   a second removable peripheral bin disposed on a rear wall of the base; and
   a power and data assembly including a power relay and a data relay configured for use with mobile devices; the power and data assembly disposed proximate a rear of the first removable peripheral bin and a side of the second removable peripheral bin.

2. The seating assembly of claim 1, further comprising:
   a third removable peripheral bin operably coupled with the base.

3. The seating assembly of claim 1, wherein at least one of the first and second removable peripheral bins includes an inductive charging feature.

4. The seating assembly of claim 1, wherein the power relay includes a three prong receiver configured to receive a three prong plug.

5. The seating assembly of claim 1, wherein the first and second removable peripheral bins include walls that are integrally formed together.

6. The seating assembly of claim 1, wherein at least one of the first and second removable peripheral bins is sized to accommodate a laptop computer.

7. A seating assembly comprising:
   a base;
   a cushion assembly rotatably coupled with the base proximate a forward portion of the cushion assembly;
   a first peripheral storage bin disposed on a side wall of the base;
   a second peripheral storage bin disposed on a rear wall of the base; and
   one of a power plug assembly and a data plug assembly juxtaposed between the first and second peripheral storage bins.

8. The seating assembly of claim 7, further comprising:
   a third peripheral storage bin operably coupled with the base.

9. The seating assembly of claim 7, wherein at least one of the first and second peripheral storage bins includes an inductive charging feature.

10. The seating assembly of claim 7, wherein the power plug assembly includes a three prong receiver configured to receive a three prong plug.

11. The seating assembly of claim 7, wherein the first and second peripheral storage bins include walls that are integrally formed together.

12. The seating assembly of claim 7, wherein at least one of the first and second peripheral storage bins is sized to accommodate a laptop computer.

13. A seating assembly comprising:
   a base;
   a cushion assembly rotatably coupled with the base proximate a forward portion of the cushion assembly;
   a first peripheral storage bin disposed on a side wall of the base;
   a second peripheral storage bin disposed on a rear wall of the base; and
   a power and data assembly extending from the first peripheral storage bin and in abutting contact with the second peripheral storage bin.

14. The seating assembly of claim 13, further comprising:
   a third peripheral storage bin operably coupled with the base.

15. The seating assembly of claim 13, wherein at least one of the first and second peripheral storage bins includes an inductive charging feature.

16. The seating assembly of claim 13, wherein the power and data assembly includes a three prong receiver configured to receive a three prong plug.

17. The seating assembly of claim 13, wherein the first and second peripheral storage bins include walls that are integrally formed together.

18. The seating assembly of claim 13, wherein at least one of the first and second peripheral storage bins is sized to accommodate a laptop computer.

* * * * *